Figure 1:
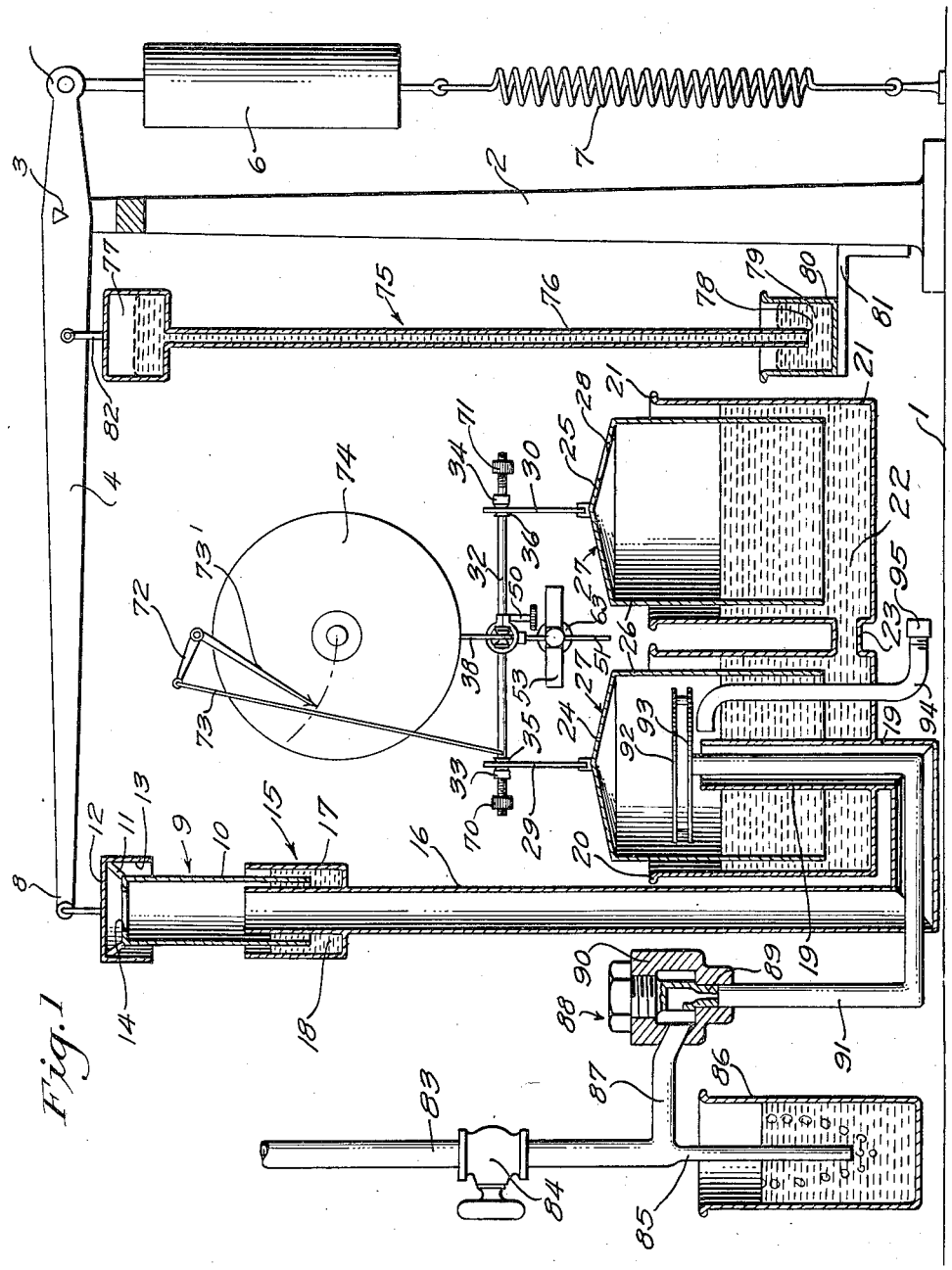

Feb. 1, 1938.  G. S. BINCKLEY  2,106,966
GAS GRAVITOMETER
Filed May 6, 1935  2 Sheets-Sheet 1

INVENTOR,
GEORGE S. BINCKLEY,
BY
ATTORNEY

Feb. 1, 1938.   G. S. BINCKLEY   2,106,966
GAS GRAVITOMETER
Filed May 6, 1935   2 Sheets-Sheet 2
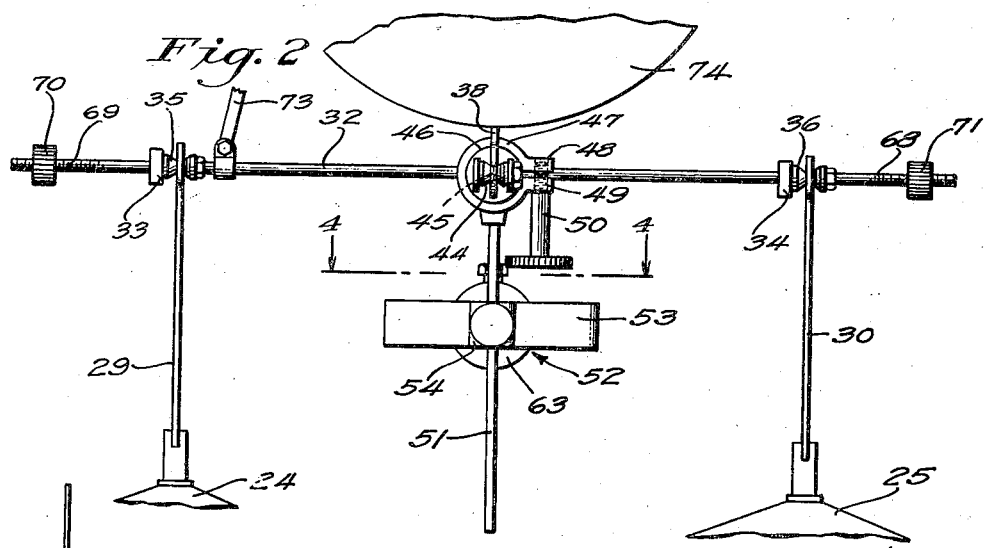
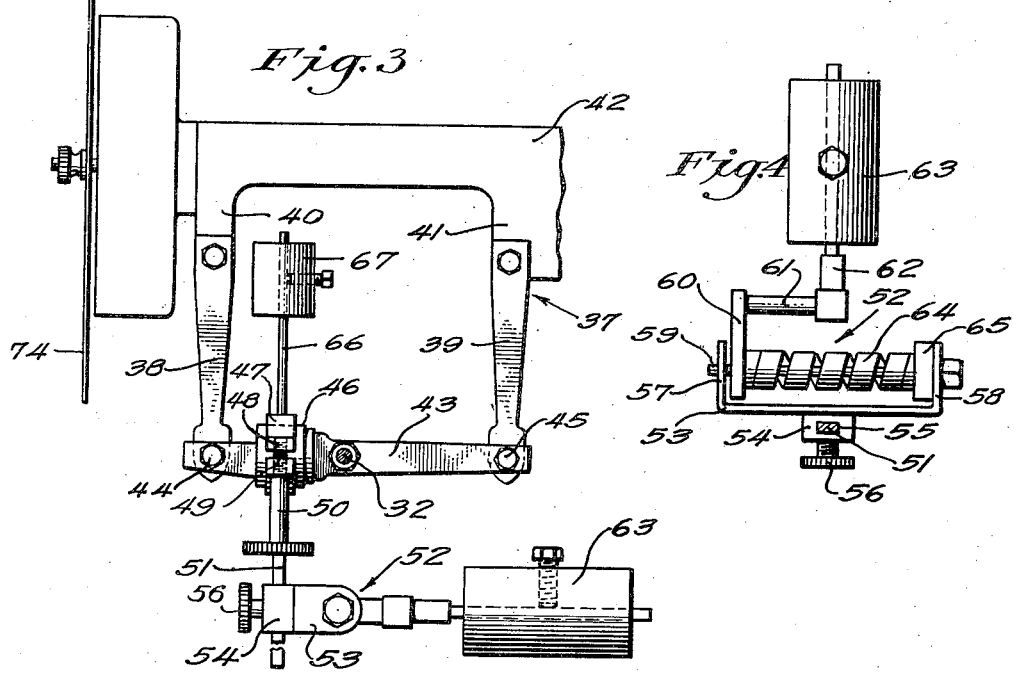
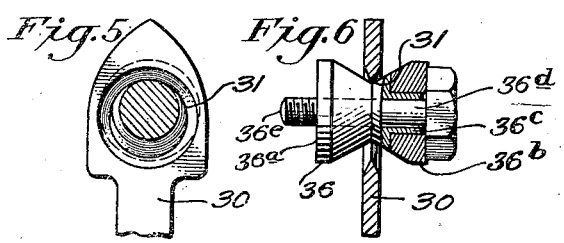
INVENTOR,
GEORGE S. BINCKLEY,
BY
ATTORNEY.

Patented Feb. 1, 1938

2,106,966

UNITED STATES PATENT OFFICE 2,106,966

GAS GRAVITOMETER

George S. Binckley, Los Angeles, Calif.

Application May 6, 1935, Serial No. 20,075

5 Claims. (Cl. 265—44)

This invention relates to gas gravitometers. Particularly, the invention has to do with determining the specific gravity of gases and the invention contemplates a direct weighing instrument adapted to produce a highly accurate, temperature-compensated record of the specific gravity of the gas or gases.

The invention, as will hereinafter appear, is so constructed that electric motors, pressure regulating valves, and other mechanical complexities are eliminated. The invention is so constructed and arranged that when it is once calibrated and properly installed, no further attention is required except that attention which is necessary to cause proper operation of the device, such as changing a chart, supplying ink to the recording pen, and the like.

Briefly stated, the invention operates on the principle of weighing the difference between a column of gas and a column of equal height of air; the difference in weight between the two columns is the measure of the force necessary to operate certain instrumentalities which, in turn, allows pen mechanism to move over a chart in direct ratio to the specific gravity of the gas sample. The record made reads directly to the second, and by easy and close approximation to the third place of decimals.

The parts, members and features of the invention are arranged to minimize friction, all to the end that the instrument is responsive to minute variations in the specific gravity of the sample, and durability of the instrument is practically without limit. Furthermore, the instrument is silent, simple and compact.

In accordance with the above statements, an object of this invention is to provide means whereby the specific gravity of a small continuously flowing sample of gas is automatically recorded on a chart and indicated at all times by the position of the recording pen or stylus on the surface of the chart.

Another object of the invention consists in providing an instrument wherein variations in barometric pressure are automatically compensated, to the end that accuracy of the record of specific gravity of the gas sample is not affected by pressure change.

The invention contemplates among other objects a device which is positive in operation, accurate, with few parts liable to get out of order, which may be readily repaired where necessary, and generally superior to devices now known to the inventor.

With the above mentioned and other objects in view, the invention consists in the novel and useful provision, formation, construction, association, and relative arrangement of parts, members and features, all as described generally in the specification, shown in the drawings, and finally set forth as to specific detail in the claims.

In the drawings:

Figure 1 is a diagrammatic, partially sectioned lay-out of the device of this invention, Figure 2 is a fragmentary elevation on an enlarged scale from the showing of Figure 1 and showing certain details of members of the invention, Figure 3 is a fragmentary side elevation of certain means used in balancing the instrument, Figure 4 is an enlarged view taken on the line 4—4 of Figure 2, Figure 5 is a fragmentary enlarged view, partially in section, of a pivot means utilized in the invention, and, Figure 6 is a sectional view revolved 90° from the showing of Figure 5.

In order to gain a proper understanding of the invention, reference will be made to the figures of the drawings with the idea of designating the parts thereof to the end that the statement of operation of the invention will be fully understood.

Referring to Figure 1, the line 1 is the base to which may be secured a pedestal 2. This pedestal in turn, and adjacent the uppermost extremity thereof, is so formed as to receive the knife edges 3 of a lever 4. One extremity 5 of the lever 4 has swingingly secured thereto a weight 6 and interposed between the weight 6 and the base 1 is a coil spring 7. The said weight and coil spring 7 normally urge the lever 4 to rotate in a right-hand direction, viewing Figure 1. The opposite extremity 8 of the lever 4 has depending therefrom a member 9. The member 9 includes a tube 10 secured by means of a spider or webbing 11 to a cap 12. The said cap has the inner wall surface 13 thereof spaced from the periphery of the tube 10 and the top of said cap is likewise spaced from the outermost end of what may be termed the egress end of said tube, as indicated at 14. Thus, any movement of a fluid, such as gas through the tube would occur in one direction between the said cap and the said tube. The tube 10 has its opposite end received within a jacket-type member 15. The jacket-type member includes in part an elongated tube 16, which will be designated as the gas column tube, and a member 17 having a wall spaced from the periphery of the tube and a base portion joined with said tube. This jacket is adapted to receive a fluid 18 within which the tube 10 dips. Thus, there is provided what may be termed a liquid seal at this zone.

It will be noted that the gas column tube 16 has an elongated portion, and a portion 19 received within the confines of a sealing tank 20. The sealing tank 20 is in communication with a second tank 21 and both said tanks are adapted to receive a sealing liquid 22, communicating between said tanks. To this end, the tanks are formed with means of communication 23 adjacent the bases thereof. Within the tank 20 is a working bell 24 and the tank 21 receives therein a balance bell 25. Both bells are in the form of inverted cups in that both said bells include a side wall 26 and a top wall 27 joined with the side wall. This top wall may be domed although, in the present instance, the drawings show the top wall as conical in form. The top wall 27 of the balance bell 25 is provided with an enlarged opening 28 while the top wall 27 of the working bell is closed. It will be observed that both the working bell and balance bell are received within the sealing liquid 22. The working bell and the balance bell are provided with links 29 and 30. These links are mounted at one end to the top walls of the said bells and opposite ends of said links are bored in the form of a knife edge, as best illustrated in Figures 5 and 6 at 31.

32 is a beam and secured thereto are short length blocks 33 and 34. The said blocks carry knife edge bearings or pivots 35 and 36, which in turn engage the knife edges of the links 29 and 30. Pivots 35 and 36 are identical in construction, and the pivot 36 is shown in Figures 5 and 6. It is to be observed that the pivot 36 is formed in two parts, as shown at 36ª and 36ᵇ. The part 36ᵇ is carried upon the reduced portion 36ᶜ of the part 36ª and a headed bolt 36ᵈ is passed through a central bore in the part 36ª in such a manner that the head of the bolt engages the end surface of 36ᵇ while the shank of the bolt has its screw-threaded end 36ᵉ extending beyond the end surface of 36ª. The lever 34 in the case mentioned is in turn secured to this threaded end 36ᵉ. The beam 32 is carried by means 37. Said means 37 includes a pair of spaced apart links 38 and 39 secured to lugs 40 and 41 of a bracket 42, which bracket in turn is adjustably secured to a pedestal or supporting member (not shown).

A member 43 is provided with bifurcated ends, and between the bifurcations are knife edge pivots 44. The links 38 and 39 both have knife edges 45 engaging said pivots 44. The beam 32 is passed through and secured to the member 43 in any approved manner. The member 43 is provided with a transverse enlargement or boss 46 having a circular periphery. Adapted for engagement with the enlargement 46 is a wing type clamping ring 47. The wing 48 is threaded and the wing 49 provided with a plain bore to permit the threaded end of a clamping screw 50 to slide therethrough upon rotation of 50. This construction permits the clamping ring to be adjusted to various positions relative to the enlargement 46. This clamping ring has depending therefrom a substantially flat bar 51 and adjustably slidable thereon is a temperature compensating device 52, the bar 51 and device 52 constituting a pendulum. The temperature compensating device includes a stirrup or U-shaped bar 53 provided with a stud 54 having a transverse opening 55 therein and through which opening the bar 51 may pass. A locking screw 56 carried by the stud may engage the bar 51 for the purpose of locking the device in an adjusted position on the bar. Between ends 57 and 58 of the member 53 is a pin 59. Swingingly carried on said pin is a lever 60. The lever 60 in turn carries an extension 61 substantially at right angles to said lever 60, and the extension 61 has secured thereto a member 62 substantially parallel to the lever 60 and in alignment with the bar 51. This member 62 is adapted to adjustably support or carry a weight 63. Loosely coiled around the pin 59 is a bi-metal temperature responsive device 64, one end of which is secured to lever 60 and the opposite end to a block 65, which block in turn is secured to the end 58 of the U-shaped member 53. It is evident that changes in temperature will affect the coils of the bi-metal temperature responsive device to rotate the lever 60 in one of two directions.

Secured to the clamping ring 47 is a rod 66 and adjustably movable upon said rod is a weight 67.

It is evident from the description so far given that the beam 32 may tip on the two fulcrums constituting the two knife edge members shown at 44 and 45 when the bells 24 and 25 are relatively moved. In order to properly balance the beam, I have screw-threaded both ends of said beam at 68 and 69 and provided weights 70 and 71 for engagement with said screw-threads. Thus, the beam may be balanced by shifting the weights relative to the fulcrum points. Interposed between the beam 32 and a lever 72 is a link 73. The lever 72 in turn operates an arm, pointer, or recording pen 73' to pass said member 73' over a disc 74, upon which may be placed a calibrated chart. Thus, movement of the beam will cause movement through the link and lever of the member 73'.

Secured to the lever 4 is barometric pressure means 75. Said means includes an elongated tube 76, the uppermost end of which is enlarged to provide a normally closed chamber 77 and the lowermost end 78 of which dips within mercury or the equivalent 79 contained within a vessel 80. The vessel 80 may be secured to a bracket 81 extending from the pedestal 2. A link 82 is secured to the chamber portion 77 and to the said lever 4.

A pipe 83 communicates with a source of supply of the gas to be tested and interposed in said pipe is a valve 84, for controlling passage of gas therethrough. Said pipe is provided with an extension 85 received within a vessel 86, the said vessel normally confining some fluid and the depth of immersion of the extension 85 within said fluid regulating the gas pressure through said pipe. This extension is ordinarily known as the drop tube. A further extension 87 from said tube leads to a member 88 provided with a gas regulating orifice 89. The member 88 includes a housing 90 which normally confines the gas regulating orifice 89 and likewise one end of a pipe 91 in communication with said orifice. The pipe 91 is received within the gas column pipe 16 and its extended portion 19. Spaced diffuser discs 92 and 93 are within the working bell, and pipe 91 has its egress end in communication with the space between said discs. 94 is a tube adapted to communicate with the atmosphere and with the interior of the working bell above the normal level of any fluid contained therein. This tube is provided with an external cap 95. The tube 94 when the cap 95 is removed, permits a gas sample to be taken from the interior of the bell. It is sometimes important to determine the character of the gas sample, in advance of any actual operation of the device, as to purity and other characteristics.

The operation of the gas gravitometer which is embodied in this invention is based upon the fact that a column of gas which is confined within a tube exerts a pressure on the interior of the tube at any point in its height greater or less than the atmospheric pressure at a corresponding point exterior to the tube, as the specific gravity of the gas is greater or less than unity, dry air being employed as the standard, with a gravity of 1.0.

Within the narrow limits of height employed in practice in the instrument as described, no significant error exists in the assumption that the air-gas pressure differential varies directly as the height of the column.

In operation, the gravitometer being connected with the source of the gas sample, and the interconnected sealing-liquid tanks 20 and 21 being charged with the sealing liquid, gas is admitted through valve 84 to the extent necessary to cause the escape of a small amount of gas through the lower end of the drop tube 85, this surplus passing to the atmosphere. Gas passing through the tube 87 to the orifice 89 is thus limited in its pressure to the depth of liquid above the bottom of the drop tube in the vessel 86. Under the pressure thus limited, gas flows through the orifice 89 into the tube 91, and between the diffuser discs 92, 93 into the interior of the working bell 24. That part of the interior of the working bell 24 which is above the level of the sealing liquid is thus filled with the gas sample, which then flows under the lower diffuser disc 93 and into the upper end of the tube 19 which surrounds the tube 91 and thence through the gas column tube 16 to its top and into the atmosphere.

When the interior of the working bell 24, the connecting tubes 83, 85, 87, and the gas column 16 are thus filled with gas, the difference in pressure of the gas under the head of the working bell 24 and of the atmospheric air on top of this head, will tend to cause the working bell to rise or sink in the sealing liquid 22 as the gas is heavier or lighter than air. The force represented by this difference in pressure, acting upon the cross sectional area of the working bell, is resisted by the weight 63 of the pendulum, the center of gravity of the weight is in a position vertically below the fulcrum of the beam 32 when the pressure inside and outside the head of the working bell is equal.

The position of the pendulum and the working bell will vary directly as the variations in pressure inside and outside the working bell, hence the position of the pen or pointer 73' which indicates or records the specific gravity of the gas will, through its connection with the beam 32, vary directly with this pressure variation, and by this means produce a momentary indication or a permanent record of variations in the specific gravity of the gas sample flowing through the gravitometer.

The functions of the balance bell 25 are purely compensatory. By its weight, it balances the weight of the working bell 24 on the beam 32 and neutralizes temperature effects on the length of the two arms of this beam. Its use minimizes the effects of changes in density of the sealing liquid 22 due to evaporation or variations in temperature, and balances exactly the effects of surface-tension of the sealing liquid on the walls of the bell, and variations in such surface-tension due to changes in temperature. Its interior is freely and permanently in communication with the atmosphere through opening 28, so that its rise and fall with the movement of the working bell is without resistance.

The operation of the instrument as described would be strictly correct and accurate so long as standard conditions of temperature and barometric pressure were maintained, this standard being established for convenience at 60° Fahr. and 30" of mercury. However, if the temperature departs from the standard, the difference in the increase or decrease in the unit weight of air and gas, due to this departure, is not in direct proportion to the specific gravity of the gas. If the temperature rises, the relative weight of gas of a given specific gravity becomes less; hence, in order that the true gravity shall be recorded by the instrument under these conditions, the resistance of the pendulum weight 63 must be decreased in this same proportion. This effect is produced by supporting the pendulum weight on the thermostatic element 64 which may be composed either of straight bi-metallic strips or a helical coil of the same kind of metal, so arranged that with a rise in temperature the center of gravity of the pendulum weight will be brought closer to the fulcrum in direct proportion to the change in the air-gas differential due to this change in temperature, so that the recorded specific gravity of the gas will be the same, independent of temperature variations where the barometric pressure remains constant.

Variations in the barometric pressure from the standard of 30" of mercury also have an effect upon the apparent specific gravity of the gas sample, as changes in density of the gas within the working bell and gas column and the atmospheric air outside cause a change in the apparent specific gravity of the same gas. This effect is relatively unimportant within the normal range of barometric pressure in any one locality but may be recognized where extreme accuracy of the record is demanded, or where it is necessary to shift the instrument for service at different altitudes.

In order to eliminate the effects of variations in barometric pressure as a source of possible error in the specific gravity record, I embody in this invention means for automatic correction for variations in barometric pressure.

The upper section 9 of the gas column 16 is suspended from one end of the lever 4 with its lower end immersed in the sealing liquid 18 in the cup 17. The upper section 9 of the gas column 16 thus hangs without physical contact with the main column, and is free to rise or descend with variations in the position of the end of the lever 4. This lever, which may be supported by any suitable means 3 affording the minimum of frictional resistance to motion, also supports on its same arm the mercury chamber 77 and integral with it the pendant tube 76, the lower end 78 of which is immersed in the mercury 79 in the well or vessel 80. A high degree of vacuum is maintained in the upper part of the mercury chamber 77 so that variations in barometric pressure will cause mercury to flow from the well 80 into or out of the chamber 77, thus adding to or taking away from the weight suspended on the lever arm. The opposite end of the lever 4 supports a counter-balance weight 6, which partially balances the weight of the mercury chamber 77 and its contained mercury, and the weight of the upper section 9 of the gas column. The spring 7 has sufficient tension to hold the lever and its appurtenances in such a position that the height of the column will be normal at the standard pressure of 30" of mercury. If the barometric pressure becomes less, the weight of mercury in the chamber 77 decreases, and it, with the column-section 9, will rise enough to exactly compensate for the effect of decreased pressure on the air-gas differential. If the pressure rises, of course the opposite effect and compensation will be accomplished. By this means, barometric pressure variations have no effect upon the accuracy of the record of specific gravity of the gas passing through the instrument. The calibration of this element of the invention is effected by adjustments in the tension of the spring 7.

In order that the operation of this gravitometer shall be as free as possible from friction or other internal resistance, the bells are suspended from the beam upon extremely hard steel knife-edge links, and the fulcrum upon which the assembly of bells, pendulum, and temperature compensator rests is also constructed so that this weight is carried on hard steel knife-edges. By this means, minute differences in specific gravity are accurately indicated and recorded.

While the form of gravitometer shown on the accompanying drawings and described in this specification is one generally applicable, it is obvious that the same essential elements in this invention may be greatly varied in their arrangement.

I claim:

1. In a device of the character disclosed, a fulcrumed beam, a pendulum secured to said beam, means for varying the angle of the pendulum with respect to the axis of the beam, a pendulum weight, and thermostatic means between the pendulum and said weight to vary the position of the pendulum weight with reference to the fulcrum of the beam.

2. In a recording gas gravitometer, a pair of inverted bells constituting a working bell and a balance bell, a fulcrumed beam adapted to spacedly carry said bells, a tank for receiving said bells, said tank adapted to hold a liquid for sealing the space between said tank and said bells, means for conducting a gas sample within said working bell, and means for conducting said gas sample outwardly from said bell; said balance bell being open to the atmosphere, a pendulum secured to said beam, a lever mounted on said pendulum, a weight secured to said lever, a thermostat between said weight and the lever, said thermostat being so calibrated that the center of gravity of the weight is shifted in direct ratio to the change in gas-air differential due to a given temperature variation.

3. In a gas gravitometer of the character disclosed, a fulcrumed lever; a weight, and a spring anchored at one side of the fulcrum point of said lever, and a barometric pressure compensating element secured to said lever on the opposite side of said fulcrum point, said barometric pressure compensating element comprising a tube having one end adapted for reception within a vessel holding mercury and its opposite end adjacent the said lever provided with a closed chamber of greater diameter than the diameter of the tube; said weight and spring adapted to partially balance the weight of any mercury within the closed chamber of the tube to hold the said lever in such position that the height of the column of mercury will be normal at the standard pressure of 30 inches of mercury.

4. In a gas gravitometer, a pair of interconnected tanks adapted to confine a liquid, a pair of inverted bells within said tanks adapted to be surrounded by and have received in part therein said liquid to provide a liquid seal therebetween; means for conducting a gas sample within one of said bells and above the liquid contained therein, said other bell having the space above the liquid therein open to the atmosphere; a gas column means communicating with the interior of the gas sample receiving bell, a beam carrying the pair of bells and fulcrumed therebetween and, means secured to said beam for indicating movement thereof; said gas column means including a pair of telescoping tubes provided with a liquid seal therebetween.

5. The combination in a recording gas gravitometer having a pair of inverted bells constituting a working bell and a balance bell, a tank for receiving said bells, the tank holding a liquid for sealing the space between said tank and bells, a fulcrumed beam adapted to spacedly carry said bells, means for conducting a gas sample within said working bell, and means for conducting said gas sample outwardly of said bell; the said balance bell being open to the atmosphere, of a pendulum secured to said beam, a lever mounted on said pendulum, a weight secured to said lever, a thermostat between said weight and the lever, said thermostat being so calibrated that the center of gravity of the weight is shifted in direct ratio to the change in air-gas differential due to a given temperature variation.

GEORGE S. BINCKLEY.